(12) United States Patent
Lamarre et al.

(10) Patent No.: US 10,823,113 B2
(45) Date of Patent: Nov. 3, 2020

(54) METHOD AND SYSTEM FOR LIMITING POWER OF AN ENGINE

(71) Applicant: PRATT & WHITNEY CANADA CORP., Longueuil (CA)

(72) Inventors: Sylvain Lamarre, Boucherville (CA); Simon Lopez, Montreal (CA); Nicolas Des Roches-Dionne, Montreal (CA); Michael Conciatori, Saint-Leonard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 207 days.

(21) Appl. No.: 15/681,531

(22) Filed: Aug. 21, 2017

(65) Prior Publication Data

US 2019/0055901 A1 Feb. 21, 2019

(51) Int. Cl.
| | | |
|---|---|---|
| *F02K 1/76* | (2006.01) | |
| *F02K 1/17* | (2006.01) | |
| *F02C 9/44* | (2006.01) | |
| *F02C 9/58* | (2006.01) | |
| *F02K 1/66* | (2006.01) | |
| *B64C 11/30* | (2006.01) | |

(52) U.S. Cl.
CPC ............ *F02K 1/76* (2013.01); *B64C 11/305* (2013.01); *F02C 9/44* (2013.01); *F02C 9/58* (2013.01); *F02K 1/17* (2013.01); *F02K 1/66* (2013.01); *F05D 2270/053* (2013.01)

(58) Field of Classification Search
CPC ...... F02C 9/58; F02C 9/44; F02K 1/66; F02K 1/17; F02K 1/76; B64C 11/30–40
See application file for complete search history.

(56) References Cited

U.S. PATENT DOCUMENTS

| | | | |
|---|---|---|---|
| 2,640,550 A | * | 6/1953 | Knapp ...................... F02C 9/58 374/110 |
| 2,737,252 A | * | 3/1956 | Knapp ...................... F02C 9/58 416/37 |
| 3,936,226 A | | 2/1976 | Harner et al. |
| 4,258,545 A | | 3/1981 | Slater |
| 4,958,289 A | * | 9/1990 | Sum ...................... B64C 11/305 416/27 |
| 6,578,794 B1 | | 6/2003 | Clark et al. |
| 6,655,126 B2 | | 12/2003 | Walker et al. |
| 6,704,630 B2 | | 3/2004 | Ostrom et al. |

(Continued)

FOREIGN PATENT DOCUMENTS

FR 2996254 4/2014

OTHER PUBLICATIONS

Search Report dated Jan. 14, 2019 in connection with European Patent application No. 18190084.6.

*Primary Examiner* — Jason H Duger
(74) *Attorney, Agent, or Firm* — Norton Rose Fulbright Canada LLP

(57) ABSTRACT

Systems and methods for limiting power of a gas turbine engine for an aircraft are described herein. A blade angle of a propeller blade of the engine and a commanded power for the engine are obtained. A thrust transition direction is determined. The commanded power is compared to a selected threshold based on the blade angle and the thrust transition direction. Power to the engine is limited when the commanded power exceeds the selected threshold.

19 Claims, 6 Drawing Sheets

(56) References Cited

U.S. PATENT DOCUMENTS

| | | | |
|---|---|---|---|
| 7,184,865 B2 | 2/2007 | Mangelsdorf | |
| 8,414,260 B2 | 4/2013 | Johnson | |
| 8,651,811 B2 | 2/2014 | Danielson | |
| 8,954,228 B2 | 2/2015 | Falkmann et al. | |
| 9,470,152 B2 | 10/2016 | MacDonald et al. | |
| 9,932,906 B2 | 4/2018 | Xiong et al. | |
| 2015/0027412 A1 | 1/2015 | Henson | |
| 2015/0219528 A1 | 8/2015 | Djelassi | |
| 2016/0010590 A1 | 1/2016 | Rolt | |
| 2016/0121998 A1 | 5/2016 | Martin Moreno et al. | |
| 2016/0208717 A1 | 7/2016 | Cai | |
| 2016/0265445 A1 | 9/2016 | Fiedler et al. | |
| 2016/0357170 A1 | 12/2016 | Beecroft | |
| 2017/0107914 A1* | 4/2017 | Lu | F02C 9/54 |
| 2018/0057184 A1 | 3/2018 | Jackowski et al. | |

* cited by examiner

METHOD AND SYSTEM FOR LIMITING POWER OF AN ENGINE

TECHNICAL FIELD

The present disclosure relates generally to engine control, and, more particularly, to limiting power of an engine.

BACKGROUND OF THE ART

Turboprop engines for aircraft may reverse the propeller blade angle to produce reverse thrust on landing or during ground maneuvers. When thrust is commanded from forward to reverse, the propeller blade passes through a disking range, in which the blade angle changes from a positive blade angle to a negative blade angle. While passing through the disking range, if engine power is not controlled, the propeller may overspeed or oscillate.

As such, there is room for improvement.

SUMMARY

In one aspect, there is provided a method for limiting power of a gas turbine engine for an aircraft. The method comprises obtaining a blade angle of a propeller blade of the engine and a commanded power for the engine; determining a thrust transition direction of the engine; comparing the commanded power to a selected threshold based on the blade angle and the thrust transition direction; and limiting power to the engine when the commanded power exceeds the selected threshold.

In another aspect, there is provided a system for limiting power of a gas turbine engine for an aircraft. The system comprises a processing unit and a non-transitory computer-readable memory having stored thereon program instructions executable by the processing unit. The program instructions are executable by the processing unit for obtaining a blade angle of a propeller blade of the engine and a commanded power for the engine; determining a thrust transition direction of the engine; comparing the commanded power to a selected threshold based on the blade angle and the thrust transition direction; and limiting power to the engine when the commanded power exceeds the selected threshold.

In another aspect, there is provided a non-transitory computer-readable medium having stored thereon program instructions for limiting power of a gas turbine engine for an aircraft. The program instructions are executable by a processing unit for obtaining a blade angle of a propeller blade of the engine and a commanded power for the engine; determining a thrust transition direction of the engine; comparing the commanded power to a selected threshold based on the blade angle and the thrust transition direction; and limiting power to the engine when the commanded power exceeds the selected threshold.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
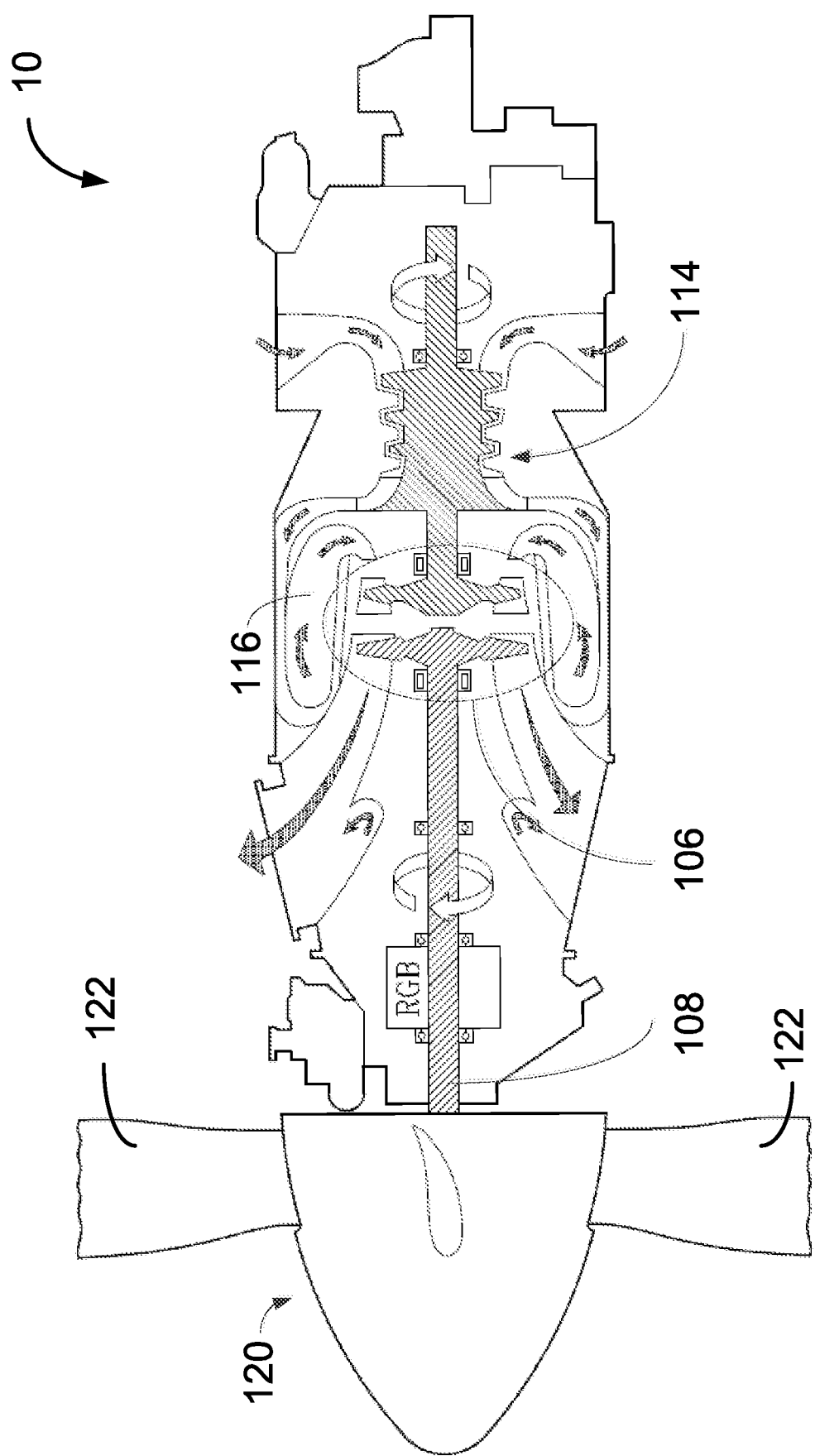
FIG. 1 is a schematic cross-sectional view of an example engine of an aircraft.

FIG. 1 illustrates a gas turbine engine 10 for which power may be limited using the systems and methods described herein. Note that while engine 10 is a turboprop engine, the methods and systems for limiting power of the engine may be applicable to other types of aircraft engines having a propeller.

Engine 10 generally comprises in serial flow communication a propeller 120 attached to a shaft 108 and through which ambient air is propelled, a compressor section 114 for pressurizing the air, a combustor 116 in which the compressed air is mixed with fuel and ignited for generating an annular stream of hot combustion gases, and a turbine section 106 for extracting energy from the combustion gases.

The propeller 120 comprises one or more propeller blades 122. A blade angle of the propeller blades 122 may be adjustable from a positive blade angle to a negative blade angle, or vice versa. The blade angle may be referred to as an angle of attack or a blade pitch. As the blade angle transitions between a positive blade angle and a negative blade angle, or vice versa, the blade angle transitions through a disking range. The disking range refers to a range of blade angles where minimal drag is produced by the propeller 120.

Figure 2:
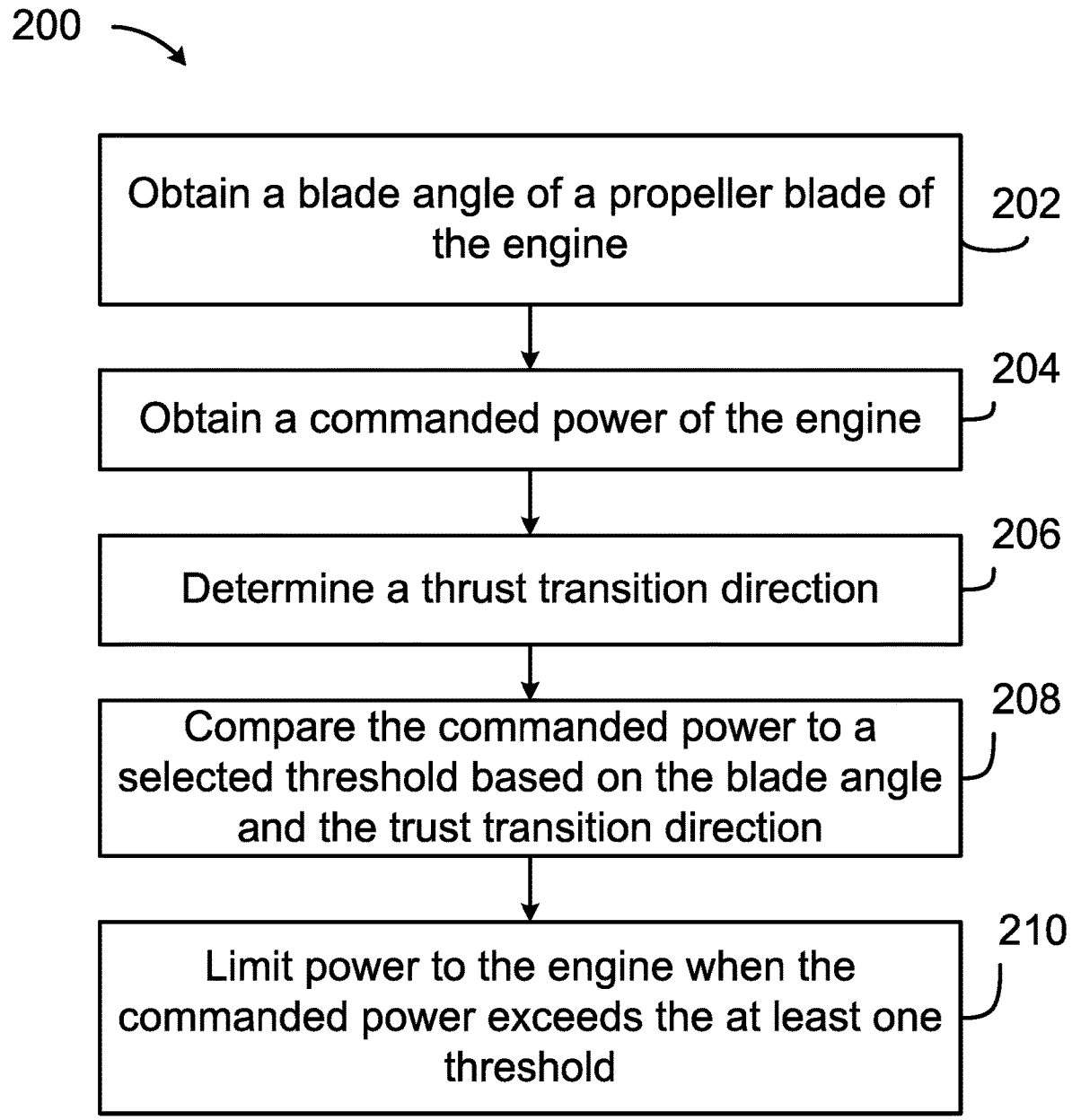
FIG. 2 is a flowchart illustrating an example method for limiting power of an engine in accordance with an embodiment.

With reference to FIG. 2, there is shown a flowchart illustrating an example method 200 for limiting power of an engine, such as engine 10 of FIG. 1. While the method 200 is described herein with reference to the engine 10 of FIG. 1, this is for example purposes. The method 200 may be applied to other types of engines depending on practical implementations.

At step 202, a blade angle is obtained. The blade angle may be obtained from one or more of the propeller blades 122. In some embodiments, the blade angle is obtained from a blade angle measuring device comprising one or more sensors for measuring an angle of one or more propeller blades 122. The blade angle may be measured at a specific point along a length of one of the propeller blades 122. The obtained blade angle may be in degrees or radians. In some embodiments, the blade angle may be obtained by measuring position or movement of a beta ring of the engine 10, where position of the beta ring depends on the blade angle. For example, a beta valve may be connected to the propeller 120 through the beta ring, where the beta valve is for controlling the blade angle. The movement or position of the beta ring may be measured in inches, centimeters, and the like. From the movement or position of the beta ring, the blade angle may be determined.

In some embodiments, the blade angle of the propeller blade 122 is obtained from a control system or an aircraft engine computer configured for controlling the blade angle of the propeller blades 122. For example, the blade angle may be obtained from a database associated with the control system or the aircraft engine computer.

The blade angle may be dynamically obtained in real time when needed, or may be obtained regularly in accordance with any predetermined time interval. The blade angle may be actively retrieved, or may be passively received. For example, the blade angle may be retrieved and/or received from the blade angle measuring device, the control system or the aircraft/engine computer. In some embodiments, the blade angle is obtained via existing components as part of engine control and/or operation. Alternatively, the blade angle is simply provided for the purposes of method 200. In some embodiments, the blade angle measuring device may be separate from the engine 10 and associated with other components of the aircraft. In some embodiments, step 202 comprises triggering measurement of the blade angle whenever method 200 is initiated.

At step 204, a commanded power of the engine 10 is obtained. The commanded power of the engine 10 refers to a power being commanded by a pilot of the aircraft. For example, the commanded power may correspond to a power commanded by one or more engine control levers controllable by the pilot. The one or more engine control levers may comprise one or more of a thrust lever, a power lever and/or any other suitable mechanism for commanding power of the engine 10. The commanded power of the engine 10 may be obtained based on the position of one or more engine control levers, for example, by monitoring the position of one or more engine control levers. The position of each engine control levers may be defined by an angle. For example, the position of the power lever may be referred to as a power lever angle (PLA). In some embodiments, the commanded power of the engine 10 is obtained based on the position of the PLA.

The commanded power may be dynamically obtained in real time when needed, or may be obtained regularly in accordance with any predetermined time interval. The commanded power may be actively retrieved, or may be passively received. For example, the commanded power may be retrieved and/or received from a commanded power measuring device comprising one or more sensors for measuring commanded power. By way of another example, the commanded power may be retrieved and/or received from one or more engine control levers, the control system or the aircraft/engine computer. In some embodiments, the commanded power is obtained via existing components as part of engine control and/or operation. In some embodiments, step 204 comprises triggering measurement of the commanded power whenever method 200 is initiated.

At step 206, a thrust transition direction is determined. Thrust refers to the force generated by the engine 10 through the propeller 120. Thrust of the engine 10 is generally dependent on the blade angle and a rotational speed of the propeller blades 122. In some embodiments, thrust of the engine 10 is forward thrust used to cause the aircraft to move forward. When the engine 10 is producing forward thrust, the blade angle of the propeller blade 122 is at a positive angle. In some embodiments, thrust of the engine 10 is reverse thrust used to cause the aircraft to move in reverse or is used for braking. When the engine 10 is producing reverse thrust, the blade angle of the propeller blade 122 is at a negative angle. The thrust transition direction may be a forward to reverse thrust transition or a reverse to forward thrust transition. When thrust transitions from forward thrust to reverse thrust, the blade angle of the propeller blade 122 transitions from a positive blade angle to a negative blade angle and passes through the disking range. Similarly, when thrust transitions from reverse thrust to forward thrust, the blade angle of the propeller blade 122 transitions from a negative blade angle to a positive blade angle and passes through the disking range.

Thrust may be controlled by one or more of the engine control levers. The one or more engine control levers may comprise one or more of a thrust lever, a power lever and/or any other suitable mechanism for controlling thrust of the engine 10. For example, the engine control levers may comprise a mechanism for controlling thrust direction. The thrust transition direction may be determined based on the position of one or more engine control levers. For example, the thrust transition direction may be determined by monitoring the one or more engine control levers, such as the mechanism for controlling the thrust direction. The thrust transition direction may be determined by dynamically obtaining in real time when needed the position of one or more engine control levers, or may be determined by obtaining regularly in accordance with any predetermined time interval the position of one or more engine control levers. The position of the one or more engine control levers may be actively retrieved, or may be passively received.

At step 208, the commanded power is compared to a selected threshold based on the blade angle and the thrust transition direction.

Figure 3A:
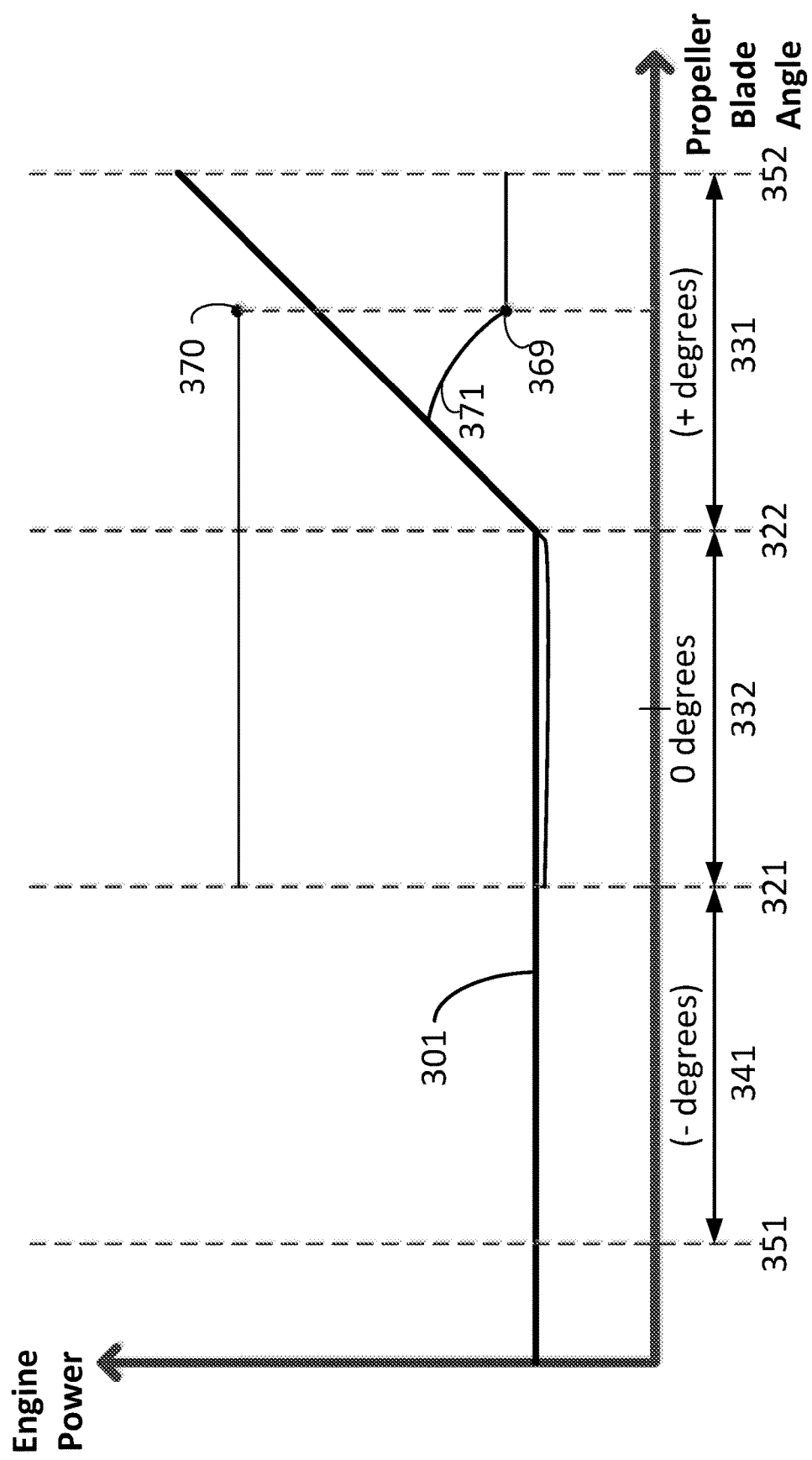
FIG. 3A is an example graphical representation of a first threshold for limiting power.
Figure 3B:
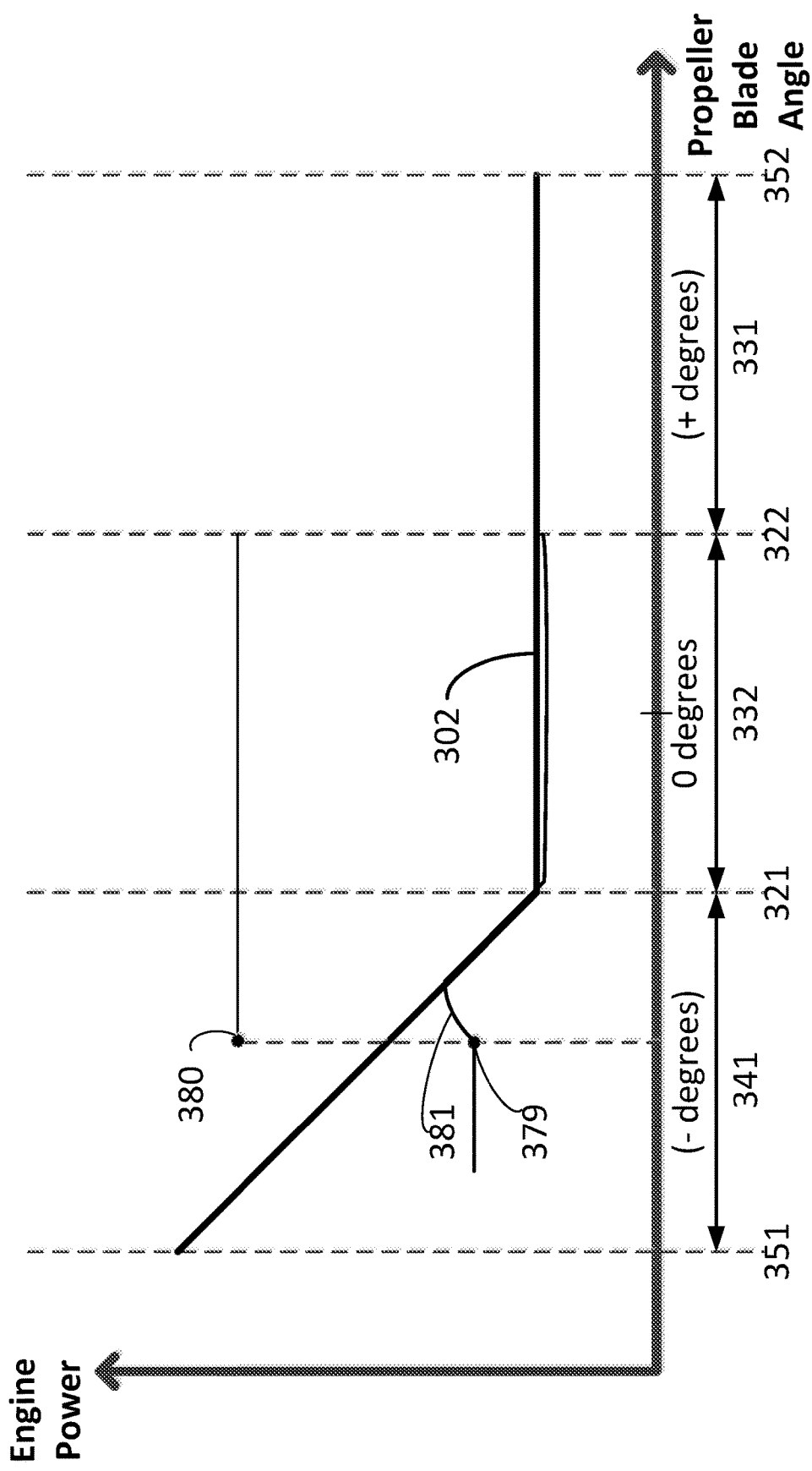
FIG. 3B is an example graphical representation of a second threshold for limiting power.

With additional reference to FIGS. 3A and 3B, a first threshold 301 and a second threshold 302 are respectively illustrated. One of the first threshold 301 and the second threshold 302 may be selected based on the blade angle and the thrust transition direction for the comparison of the commanded power thereto.

In some embodiments, when the thrust transition direction is the forward to reverse thrust transition, the commanded power is compared to the first threshold 301 until the blade angle reaches a first transition angle 321 and the commanded power is compared to the second threshold 302 after the blade angle reaches the first transition angle 321. In other words, the first threshold 301 may be selected for the forward to reverse thrust transition while the blade angle is greater than the first transition angle 321 and the second threshold 302 may be selected while the blade angle is less than the first transition angle 321. The first transition angle 321 is a negative angle. The first transition angle 321 may be −1, −2, −3, −4, −5, −6, −7, −8, −9 degrees or any other suitable value. The first transition angle 321 may be in the range of −10 to −0.1 degrees. Other values for the first transition angle 321 are also contemplated.

In some embodiments, when the thrust transition direction is the reverse to forward thrust transition, the commanded power is compared to the second threshold 302 until the blade angle reaches a second transition angle 322 and the commanded power is compared to the first threshold 301 after the blade angle reaches the second transition angle 322. In other words, the second threshold 302 may be selected for the reverse to forward thrust transition while the blade angle is less than the second transition angle 322 and the first threshold 301 may be selected while the blade angle is greater than the second transition angle 322. The second transition angle 322 is a positive angle. The second transition angle 322 may be 1, 2, 3, 4, 5, 6, 7, 8, 9 degrees or any other suitable value. The second transition angle 322 may be in the range of 0.1 to 10 degrees. Other values for the second transition angle 322 are also contemplated.

In accordance with an embodiment, the first threshold 301 varies as a function of blade angle. For example, as shown in FIG. 3A, the first threshold 301 may increase with increasing blade angle for a first positive range 331 of blade angles. The first threshold 301 may be constant for a second range 332 of blade angles, where the second range 332 is less than the first positive range 331. In some embodiments, the first positive range 331 of blade angles is defined as a range between the second transition angle 322 and an upper endpoint 352. When the blade angle is greater than the upper endpoint 352, the thresholds 301, 302 may be disabled.

In accordance with an embodiment, the second threshold 302 varies as a function of blade angle. For example, as shown in FIG. 3B, the second threshold 302 may decrease with increasing blade angle for a first negative range 341 of blade angles. The second threshold 302 may be constant for the second range 332 of blade angles, where the second range 332 is great than the first negative range 341. In some embodiments, the first negative range 341 of blade angles is defined as a range between a lower endpoint 351 and the first transition angle 321. When the blade angle is less than the lower endpoint 351, the thresholds 301, 302 may be disabled.

The second range 332 may be defined as a range between the first transition angle 321 and the second transition angle 322. The second range 332 may be selected such that all or part of the disking range is included within the second range 332.

Referring back to FIG. 2, at step 210, power to the engine 10 is limited when the commanded power exceeds the selected threshold.

When the first threshold 301 is selected, power to the engine 10 may be limited based on the first threshold 301. For example, and with reference to FIG. 3A, when the thrust transition direction is forward to reverse as set by the pilot, the pilot may additionally set the engine control lever from a first commanded power 369 to a second commanded power 370 in order to increase the commanded power. The first commanded power 369 and the second commanded power 370 illustrate commanded power as set by the engine control lever and not the actual power of the engine 10. Curve 371 illustrates the power of the engine 10 as a function of blade angle. In this example, as the blade angle decreases because of the thrust transition from forward to reverse and as the commanded power has been increased, the power of the engine (as illustrated by curve 371) is limited by the first threshold 301. When the blade angle reaches the first transition angle 321, the second threshold 302 is then selected to limit power to the engine 10, and is not described in this example.

Similarly, when the second threshold 302 is selected, power to the engine 10 may be limited based on the second threshold 302. For example, and with reference to FIG. 3B, when the thrust transition direction is reverse to forward as set by the pilot, the pilot may additionally set the engine control lever from a third commanded power 379 to a fourth commanded power 380 in order to increase the commanded power. The third commanded power 379 and the fourth commanded power 380 illustrate commanded power as set by the engine control lever and not the actual power of the engine 10. Curve 381 illustrate the power of the engine 10 as a function of blade angle. In this example, as the blade angle increases because of the thrust transition from reverse to forward and as the commanded power has been increased, the power of the engine (as illustrated by curve 381) is limited by the second threshold 302. When the blade angle reaches the second transition angle 322, the first threshold 301 is then selected to limit power to the engine 10, and is not described in this example.

The power to the engine 10 may be limited in various manners. For example, limiting power to the engine 10 may comprise limiting engine rotational speed by adjusting an engine rotational speed schedule used for controlling engine rotational speed as a function of engine power. For instance, a corrected core rotational speed (NgN) may be limited. For example, power limits in one or more NgN schedules may be adjusted to limit power to the engine 10. This may be appropriate for systems where a propeller speed control has limited authority in the disking range and/or a reverse thrust range.

Figure 4:
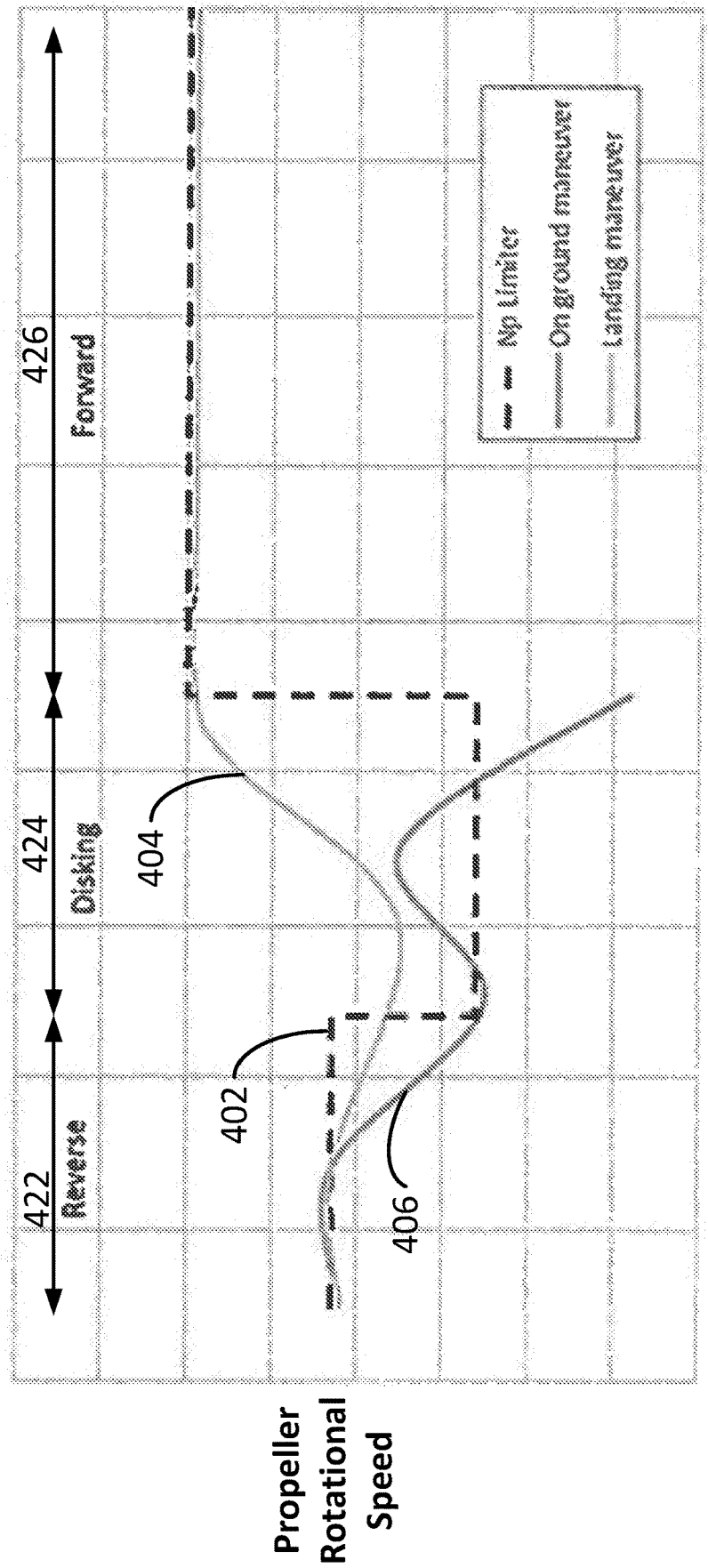
FIG. 4 is an example graphical representation of a propeller speed limiter.

By way of another example, limiting power to the engine 10 may comprises directly controlling the rotational speed of the propeller blade 122 by adjusting fuel flow to the engine 10. As torque is a function of the blade angle, limiting power to the engine 10 may be achieved by modulating a fuel flow based on a propeller speed limiter. The propeller speed limiter may be implemented by one or more schedules that varies with the ambient conditions, the engine control lever (e.g., the PLA) and/or the blade angle. With reference to FIG. 4, an example propeller speed limiter 402 is shown. Additionally shown is a first curve 404 illustrating an example of rotational speed of the propeller blade 122 as a function of blade angle for a landing maneuver. A second curve 406 is also shown illustrating an example of the rotational speed of the propeller blade 122 as a function of blade angle for an on ground maneuver. As shown, the propeller speed limiter 402 varies as function of blade angle. In some embodiments, the propeller speed limiter 402 has a first constant value for a reverse thrust range of blade angles 422 corresponding to reverse thrust of the engine 10, a second constant value for a disking range of blade angles 424 corresponding to a range where disking of the engine 10 occurs and a third constant value for a forward thrust range of blade angles 426 corresponding to forward thrust of the engine 10. Accordingly, limiting power to the engine 10 may comprise limiting rotational speed of the propeller blade such that rotational speed of the propeller blade 122 does not exceed the propeller speed limiter 402.

By way of yet another example, limiting power to the engine 10 may comprises controlling one or more of variable inlet guide vanes, an electronically actuated bleed valve, a direct fuel flow schedule and/or any other suitable mechanical component and/or control system of the engine 10. Other manners for limiting power to the engine 10 are also contemplated.

In some embodiments, at least one threshold 301, 302 is selected for an entire range of movement of the engine control lever (e.g., the PLA). For example, the first threshold 301 may be selected upon engine start. When the engine 10 is operating to produce forward thrust, the first threshold 301 is selected. When the engine control lever is moved from forward to reverse thrust, the first threshold 302 is selected. When the blade angle is less than the first transition angle 321, the threshold is switched from the first threshold 301 to the second threshold 302. The second threshold 302 is selected for all engine control lever movement while the blade angle is less than the second transition angle 322. When the engine control lever is moved from reverse thrust to forward thrust, the second threshold 302 is selected. When the blade angle is greater than the second transition angle 322, the threshold is switched from the second threshold 302 to the first threshold 301.

In some embodiments, the thresholds 301, 302 are selected for only a specific range of movement of the engine control lever (e.g., the PLA). For example, neither the first threshold 301 nor the second threshold 302 is selected upon engine start. In other words, there may be no power limit on the engine 10 until the pilot commands reverse thrust by placing the engine control lever in reverse. When the engine control lever is in reverse, the first threshold 301 could then be selected until the blade angle is less than the first transition angle 321, then the threshold is switched from the first threshold 301 to the second threshold 302. Upon displacement of the engine control lever from reverse to forward thrust, the second threshold is selected until the blade angle is greater than the second transition angle 322; afterwards, the threshold is switched from the second threshold 302 to the first threshold 301. After the blade angle is greater than the upper endpoint 352, the first threshold 301 is deactivated such that neither the first threshold 301 nor the second threshold 302 is selected.

The effect of limiting power to engine 10 based on the thresholds 301, 302 is that protection of the engine 10 is not mechanically achieved through linkage or friction (e.g., by restricting movement of the one or more control levers) but through power limit on the engine 10. This protection is active even if the pilot slams the control lever to a maximum reverse power position from a forward thrust power or idle position and/or when the pilot slams the control lever to a maximum takeoff position from a reverse thrust power position.

As described herein the thresholds 301, 302 may be selected depending on the blade angle and the thrust transition direction. The selecting of the thresholds 301, 302 based on the blade angle and the thrust transition direction is designed to create hysteresis in limiting power to the engine 10 during the disking range. It may therefore prevent or reduce initial accelerations caused by the pilot slamming the control lever to the maximum reverse power position or a maximum takeoff position. That is, initial accelerations may occur if power to the engine 10 is initially increased before the blade angle reaches a point where a limiter is enabled and limits power to the engine 10.

The thresholds 301, 302 may be dependent on operating conditions such as aircraft speed, altitude, air temperature and/or any other suitable ambient condition. Accordingly, the thresholds 301, 302 used in method 200 may be selected from a set of thresholds based on ambient conditions. For example, sensors may be used to measure the ambient conditions.

The thresholds 301, 302 may be determined by computer simulation and/or engine tests.

It should be appreciated that limiting the power to the engine 10 according to method 200 prevents the power of the engine 10 from being increased while the one or more propeller blades 122 cross the disking range.

Figure 5:
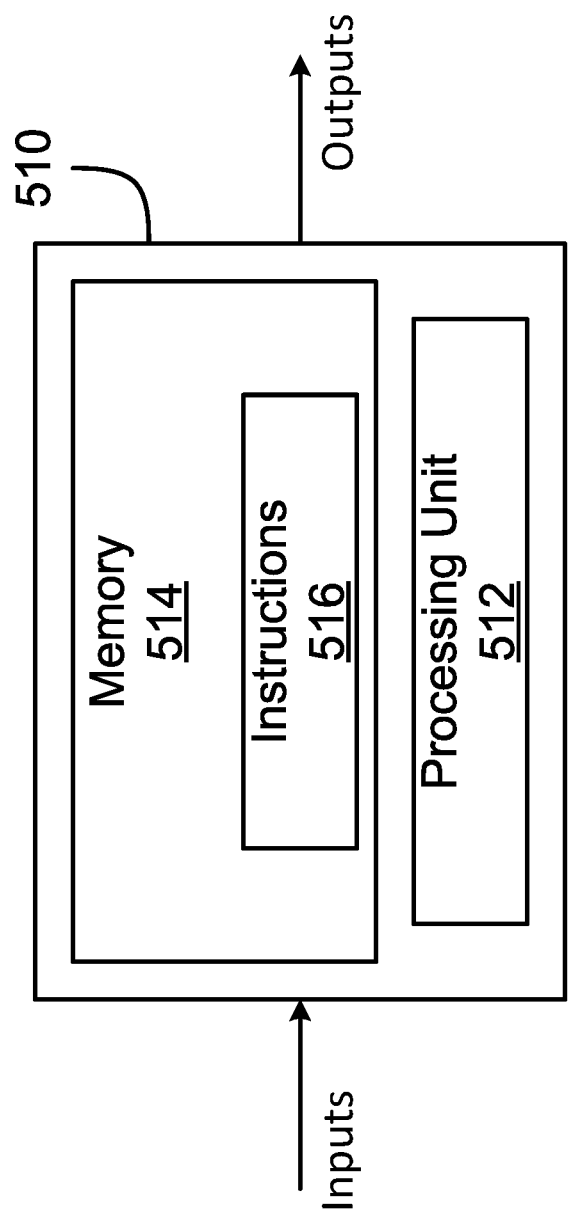
FIG. 5 is a schematic diagram of an example computing system for implementing the method of FIG. 2 in accordance with an embodiment.

With reference to FIG. 5, the method 200 may be implemented by a computing device 510, comprising a processing unit 512 and a memory 514 which has stored therein computer-executable instructions 516. The processing unit 512 may comprise any suitable devices configured to implement the system such that instructions 516, when executed by the computing device 510 or other programmable apparatus, may cause the functions/acts/steps of the method 200 as described herein to be executed. The processing unit 512 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 514 may comprise any suitable known or other machine-readable storage medium. The memory 514 may comprise non-transitory computer readable storage medium, for example, but not limited to, an electronic, magnetic, optical, electromagnetic, infrared, or semiconductor system, apparatus, or device, or any suitable combination of the foregoing. The memory 514 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 514 may comprise any storage means (e.g., devices) suitable for retrievably storing machine-readable instructions 516 executable by processing unit 512. Note that the computing device 510 can be implemented as part of a full-authority digital engine controls (FADEC) or other similar device, including electronic engine control (EEC), engine control unit (EUC), and the like.

The methods and systems for limiting power described herein may be implemented in a high level procedural or object oriented programming or scripting language, or a combination thereof, to communicate with or assist in the operation of a computer system, for example the computing device 510. Alternatively, the methods and systems for limiting power may be implemented in assembly or machine language. The language may be a compiled or interpreted language. Program code for implementing the methods and systems for limiting power may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for limiting power may also be considered to be implemented by way of a non-transitory computer-readable storage medium having a computer program stored thereon. The computer program may comprise computer-readable instructions which cause a computer, or in some embodiments the processing unit 512 of the computing device 510, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for limiting power of an engine of an aircraft may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A method for operating a gas turbine engine for an aircraft, the method comprising:
   obtaining a blade angle of a propeller blade of the engine and a commanded power for the engine;
   determining a thrust transition direction of the engine;
   selecting a threshold based on the thrust transition direction, the threshold defining a power limit for the engine as a function of the blade angle for the thrust transition direction;
   comparing the commanded power to the selected threshold based on the blade angle; and
   limiting an actual power to the engine when the commanded power exceeds the power limit for the engine of the selected threshold for the blade angle.

2. The method of claim 1, wherein comparing the commanded power to the selected threshold comprises:
   when the thrust transition direction is a forward to reverse thrust transition, comparing the commanded power to a first threshold until the blade angle reaches a first transition angle; and
   comparing the commanded power to a second threshold after the blade angle reaches the first transition angle.

3. The method of claim 2, wherein the first threshold increases with increasing blade angle for a first positive range of blade angles and is constant for a second range of blade angles, the second range being less than the first positive range.

4. The method of claim 3, wherein the second threshold increases with decreasing blade angle for a first negative range of blade angles and is constant for the second range of blade angles, the second range being greater than the first negative range.

5. The method of claim 1, wherein comparing the commanded power to the selected threshold comprises:
   when the thrust transition direction is a reverse to forward thrust transition, comparing the commanded power to a second threshold until the blade angle reaches a second transition angle; and
   comparing the commanded power to a first threshold after the blade angle reaches the second transition angle.

6. The method of claim 1, wherein limiting the actual power to the engine comprises adjusting an engine rotational speed schedule.

7. The method of claim 1, wherein limiting the actual power to the engine comprises directly controlling a speed of the propeller blade by adjusting fuel flow to the engine.

8. The method of claim 1, wherein limiting the actual power to the engine comprises controlling one or more of variable inlet guide vanes, an electronically actuated bleed valve and a direct fuel flow schedule.

9. The method of claim 1, further comprising selecting the threshold based on ambient conditions.

10. A system for operating a gas turbine engine for an aircraft, the system comprising:
    a processing unit; and
    a non-transitory computer-readable memory having stored thereon program instructions executable by the processing unit for:
       obtaining a blade angle of a propeller blade of the engine and a commanded power for the engine;
       determining a thrust transition direction of the engine;
       selecting a threshold based on the thrust transition direction, the threshold defining a power limit for the engine as a function of the blade angle for the thrust transition direction;
       comparing the commanded power to the selected threshold based on the blade angle; and
       limiting an actual power to the engine when the commanded power exceeds the power limit for the engine of the selected threshold for the blade angle.

11. The system of claim 10, wherein comparing the commanded power to the selected threshold comprises:
    when the thrust transition direction is a forward to reverse thrust transition, comparing the commanded power to a first threshold until the blade angle reaches a first transition angle; and
    comparing the commanded power to a second threshold after the blade angle reaches the first transition angle.

12. The system of claim 11, wherein the first threshold increases with increasing blade angle for a first positive range of blade angles and is constant for a second range of blade angles, the second range being less than the first positive range.

13. The system of claim 12, wherein the second threshold increases with decreasing blade angle for a first negative range of blade angles and is constant for the second range of blade angles, the second range being greater than the first negative range.

14. The system of claim 10, wherein comparing the commanded power to the selected threshold comprises:
    when the thrust transition direction is a reverse to forward thrust transition, comparing the commanded power to a second threshold until the blade angle reaches a second transition angle; and
    comparing the commanded power to a first threshold after the blade angle reaches the second transition angle.

15. The system of claim 10, wherein limiting the actual power to the engine comprises adjusting an engine rotational speed schedule.

16. The system of claim 10, wherein limiting the actual power to the engine comprises directly controlling a speed of the propeller blade by adjusting fuel flow to the engine.

17. The system of claim 10, wherein limiting the actual power to the engine comprises controlling one or more of variable inlet guide vanes, an electronically actuated bleed valve and a direct fuel flow schedule.

18. The system of claim 10, wherein the program instructions are further executable by the processing unit for selecting the threshold based on ambient conditions.

19. A non-transitory computer-readable medium having stored thereon program instructions for operating a gas turbine engine for an aircraft, the program instructions executable by a processing unit for:
    obtaining a blade angle of a propeller blade of the engine and a commanded power for the engine;
    determining a thrust transition direction of the engine;
    selecting a threshold based on the thrust transition direction, the threshold defining a power limit for the engine as a function of the blade angle for the thrust transition direction;
    comparing the commanded power to the selected threshold based on the blade angle; and limiting an actual power to the engine when the commanded power exceeds the power limit for the engine of the selected threshold for the blade angle.

* * * * *